C. BRUNSWICK.
SAFETY APPLIANCE FOR VEHICLES.
APPLICATION FILED DEC. 24, 1912.

1,077,217.

Patented Oct. 28, 1913.

2 SHEETS—SHEET 1.

Witnesses
Hugh H. Ott
V. B. Hillyard.

Inventor
Charles Brunswick
By Victor J. Evans
Attorney

C. BRUNSWICK.
SAFETY APPLIANCE FOR VEHICLES.
APPLICATION FILED DEC. 24, 1912.

Inventor
Charles Brunswick

Witnesses

By Victor J. Evans
Attorney

UNITED STATES PATENT OFFICE.

CHARLES BRUNSWICK, OF CANISTEO, NEW YORK.

SAFETY APPLIANCE FOR VEHICLES.

1,077,217.  Specification of Letters Patent.  Patented Oct. 28, 1913.

Application filed December 24, 1912. Serial No. 738,432.

*To all whom it may concern:*

Be it known that I, CHARLES BRUNSWICK, a citizen of the United States, residing at Canisteo, in the county of Steuben and State of New York, have invented new and useful Improvements in Safety Appliances for Vehicles, of which the following is a specification.

This invention has relation to mechanism coöperating with the fender and fluid controlled brake mechanism of vehicles equipped with such appliances.

The purpose of the invention is the provision of novel means for controlling the flow of the fluid to the brake mechanism in an emergency, whereby upon impact of an object with the fender the fluid passes from a storage tank or other source of supply to the brake actuating mechanism to set the brakes and thereby bring the vehicle to a quick stop, said mechanism being so arranged as not to interfere in the least with the operation of the ordinary controlling valve.

The invention consists of the novel features, details of construction and combination of parts, which hereinafter will be more particularly set forth, illustrated in the accompanying drawings, and pointed out in the appended claim.

Figure 1:
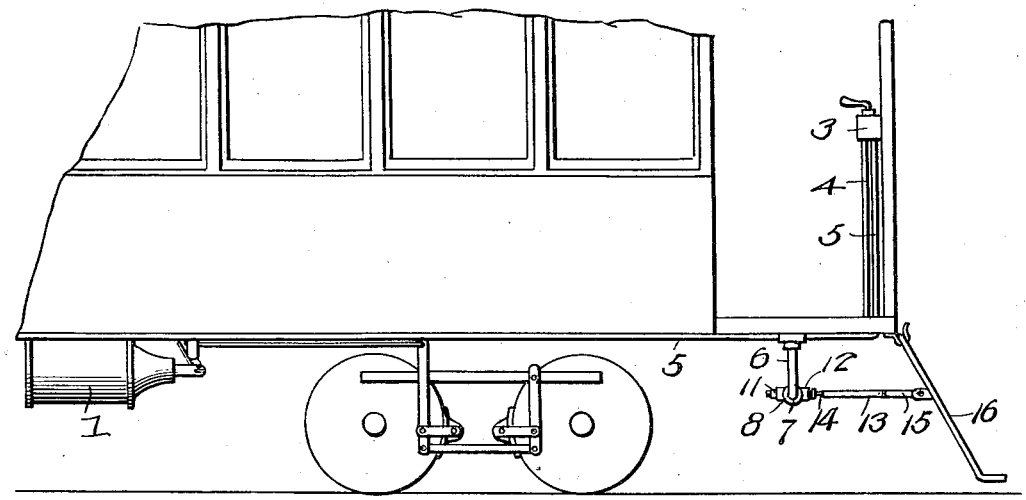
Figure 2:
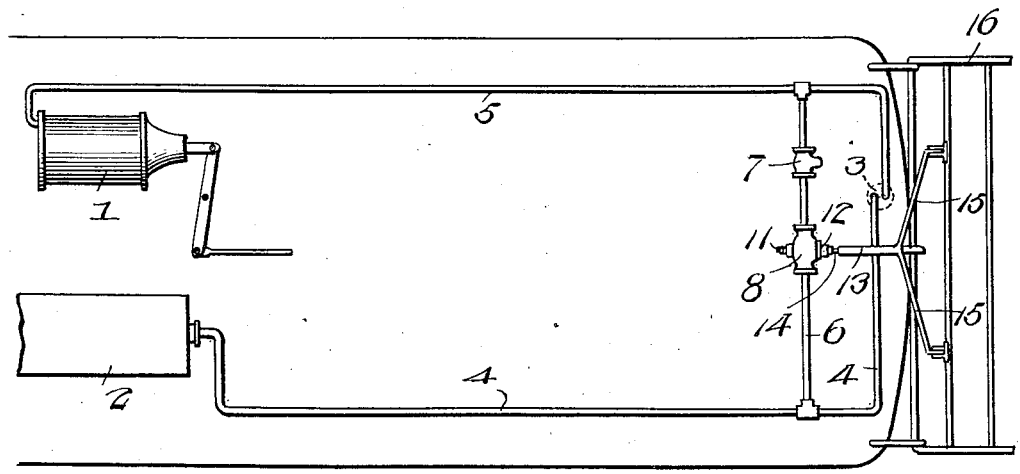
Figure 3:
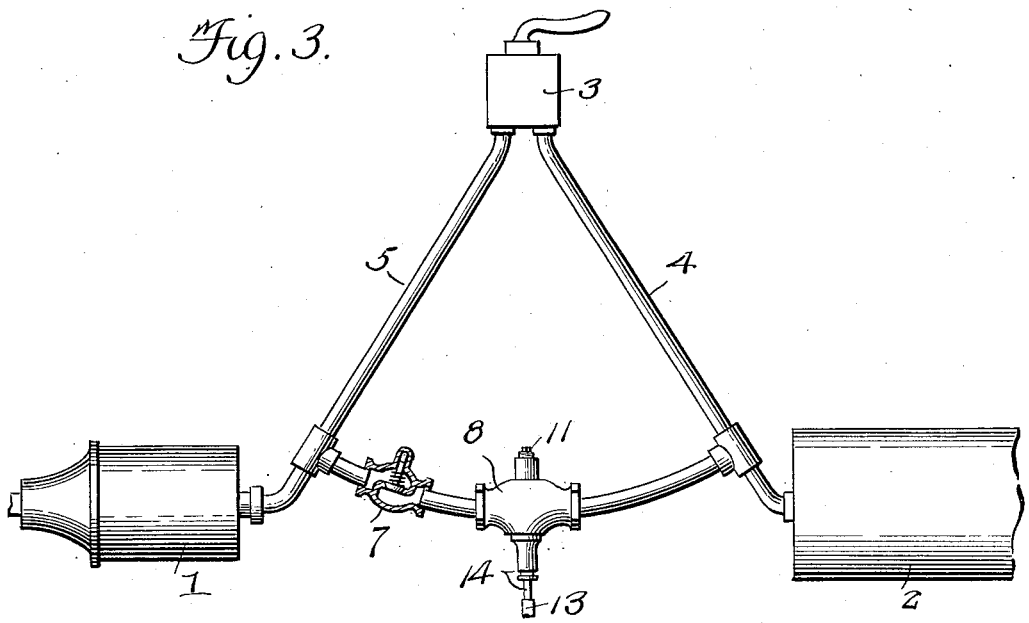
Figure 4:
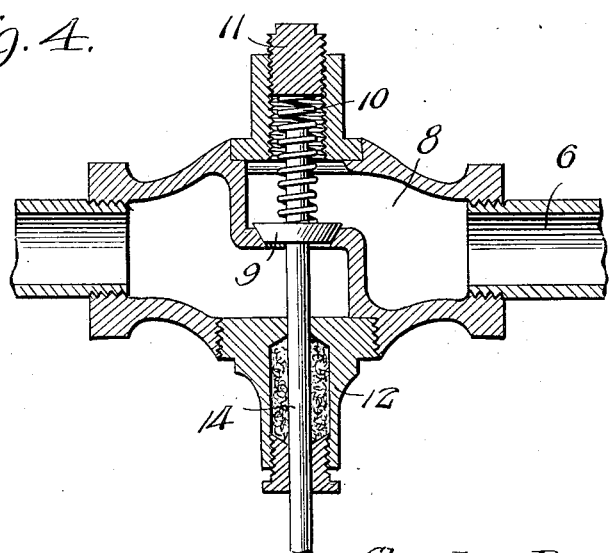

Referring to the drawings, forming a part of the specification, Figure 1 is a detail view in elevation of part of a vehicle showing the application of the invention. Fig. 2 is a bottom plan view. Fig. 3 is an enlarged diagrammatical view of the controlling valve, the storage tank, the fluid controlled brake cylinder, pipes connecting the valve with the tank and cylinder and the bridge pipe provided in its length with the check valve and the fender controlled valve. Fig. 4 is an enlarged section of the valve which is controlled from the fender or like impact part.

Corresponding and like parts are referred to in the following description, and indicated in all the views of the drawings, by the same reference characters.

It is to be understood that the invention may be applied to any type of vehicle such as a car, automobile, or other mechanically propelled machine, which contains as part of its equipment a fluid pressure controlled mechanism and a fender, the latter being arranged to be operated when coming in contact with any object in the path of the vehicle, the movement of the fender being transmitted to a valve of peculiar formation which controls the supply of the motive fluid to the brake mechanism so as to set the latter.

The numeral 1 designates a fluid controlled brake of any type, 2 indicates a storage tank or other source of fluid supply by means of which the brake mechanism is actuated and 3 is a controlling valve conveniently located and having pipes 4 and 5 connecting therewith, the pipe 4 leading from the storage tank 2 or other source of supply of the motive fluid and the pipe 5 connecting the controlling valve with the cylinder of the fluid controlled brake mechanism. A pipe connection designated generally by the numeral 6 bridges the controlling valve 3 and connects the pipes 4 and 5. This pipe connection includes a check valve 7 and a fender controlled valve 8. The check valve 7 may be of any type and prevents back pressure from the fluid controlled brake mechanism reaching the tank 2 or other source of fluid supply. The valve 8 embodies a casing provided with an internal partition having a valve seat against which a valve disk 9 is held seated by means of a spring 10 which is of helical form and of the expansible type. A plug 11 is threaded into a boss or gland of the valve casing and forms an abutment for one end of the spring 10, the effective tension of said spring being regulated by proper adjustment of the plug 11. The valve disk 9 has its stem projecting therefrom in opposite directions, one end receiving the spring 10 and the opposite end passing through a stuffing box 12 located upon a side of the valve casing opposite the spring adjusting plug 11. A connection 13 is coupled to the projecting end of the valve stem 14 and its outer end has a fork 15 which is arranged so as to be actuated by means of a fender 16, when the latter comes in contact with an object in the path of the vehicle equipped with a safety appliance embodying the invention. The fender 16 may be of any make or type and is mounted so as to yield when meeting with an obstruction. The parts are so arranged that movement of the fender 16 imparts a corresponding movement to the connection 13 and valve stem 14, thereby unseating the valve disk 9 and admitting of the motive fluid passing from the pipe 4 through the pipe connection 6 and pipe 5 into the cylinder of the fluid controlled brake mechanism, thereby actuating the latter and automatically setting the brakes in an emergency. When the valve disk 9 is unseated the fluid passing through the valve 8 also flows through the valve 7.

It will be understood that the brakes are set independently of the controlling valve 3, but the latter is used to relieve the fluid pressure of the brake mechanism to admit of the release of the brakes when it is required.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In a vehicle embodying as part of its equipment a fluid controlled brake mechanism, a valve, a fender and two pipes leading from the valve, the one to a source of fluid supply and the other to the fluid controlled brake mechanism, a pipe connection bridging the valve and connecting the two pipes leading therefrom, a check valve in the length of the pipe connection, a second valve arranged in the length of the pipe connection and embodying a casing having an inner partition in which is formed a valve seat and provided with an internally threaded gland and a stuffing box in line with the valve seat, a valve disk closing upon the seat and having a stem projecting from opposite sides thereof, one part of the stem passing through the stuffing box and the other part extending into the gland, a plug threaded into the gland, an expansible spring confined between such plug and the valve and mounted upon a portion of the valve disk stem, and a connection between the valve disk stem and fender.

In testimony whereof I affix my signature in presence of two witnesses.

CHARLES BRUNSWICK.

Witnesses:
L. H. BURRELL,
A. C. HALLETT.

---

Copies of this patent may be obtained for five cents each, by addressing the "Commissioner of Patents, Washington, D. C."